J. W. OSBORNE.
CULTIVATOR.
APPLICATION FILED FEB. 6, 1908.
902,107.
Patented Oct. 27, 1908.
3 SHEETS—SHEET 1.
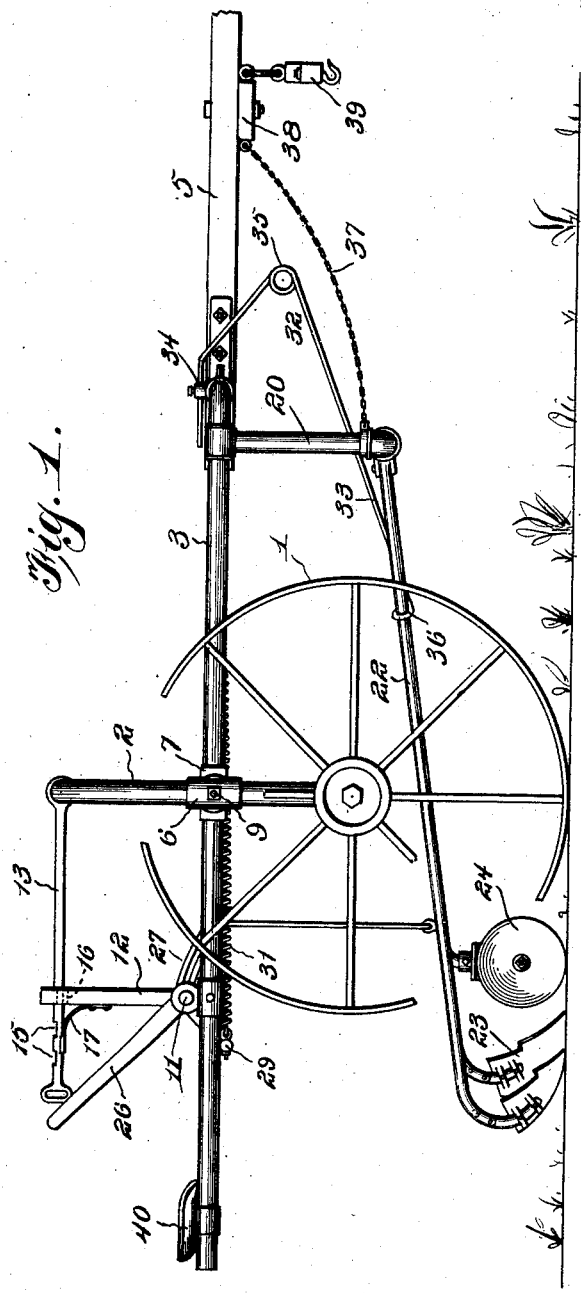
Witnesses
Louis R. Heinrichs
C. H. Giesbauer
Inventor
J. W. Osborne
by H. B. Willson & Co.
Attorneys

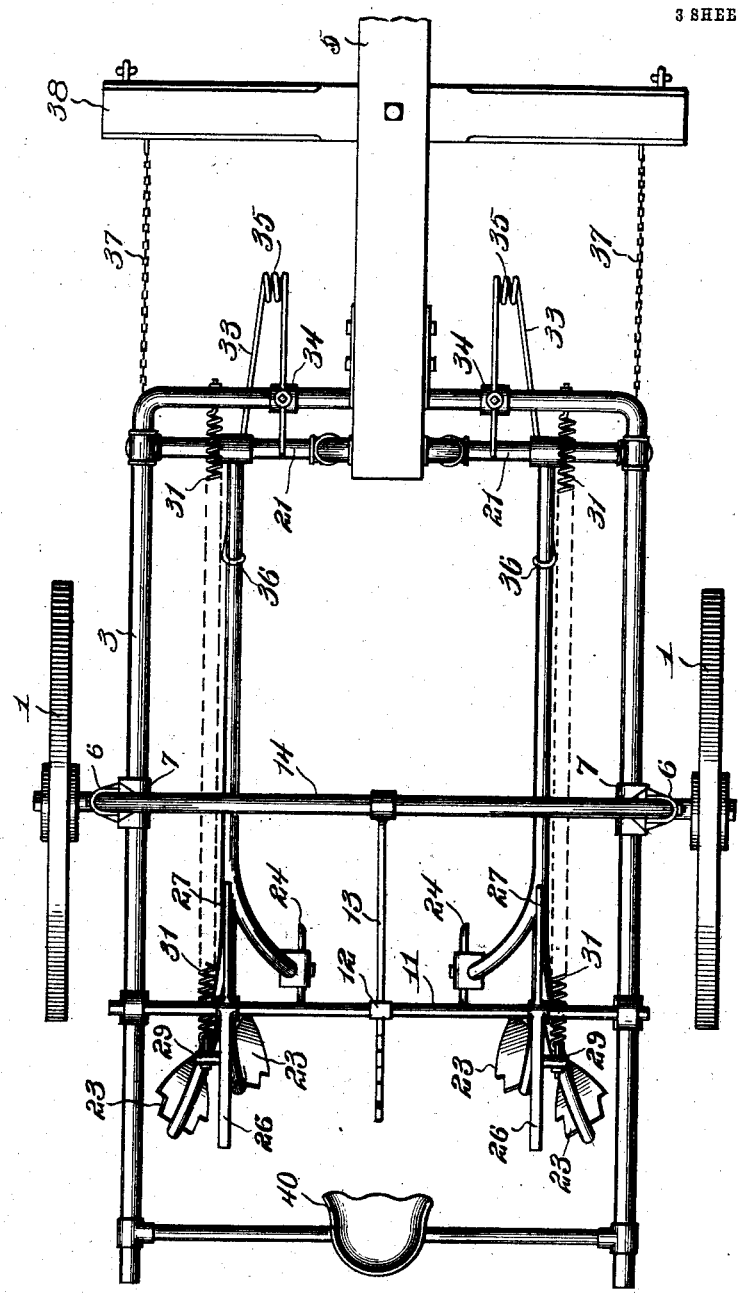

J. W. OSBORNE.
CULTIVATOR.
APPLICATION FILED FEB. 6, 1908.
902,107.
Patented Oct. 27, 1908.
3 SHEETS—SHEET 3.
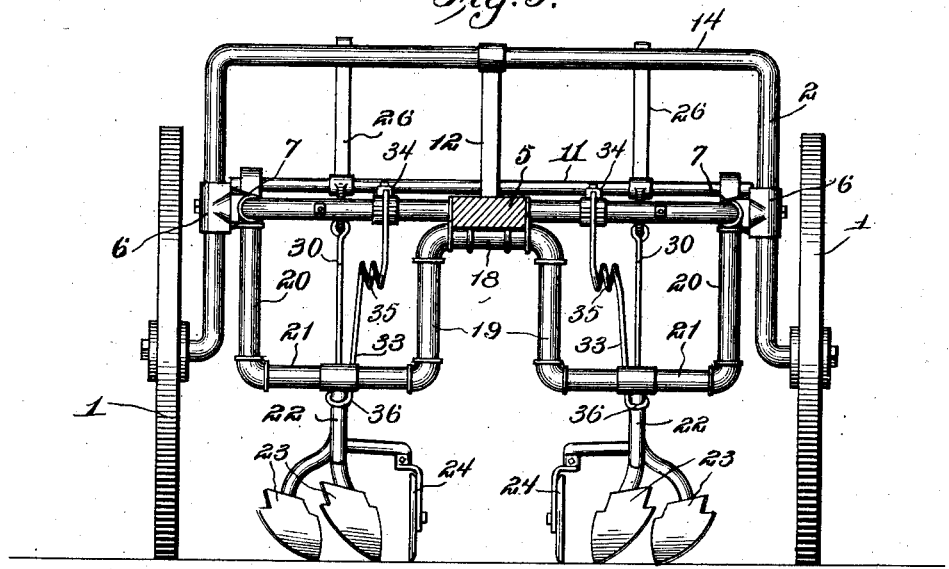
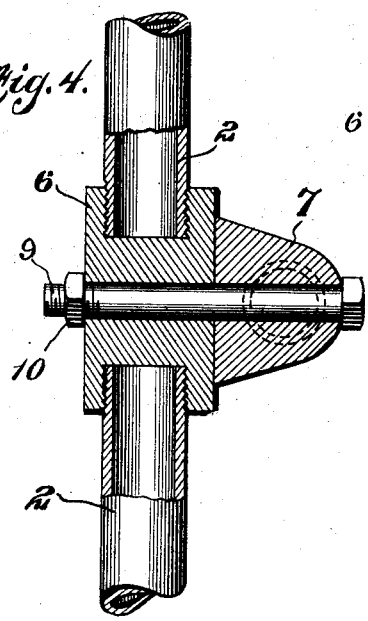
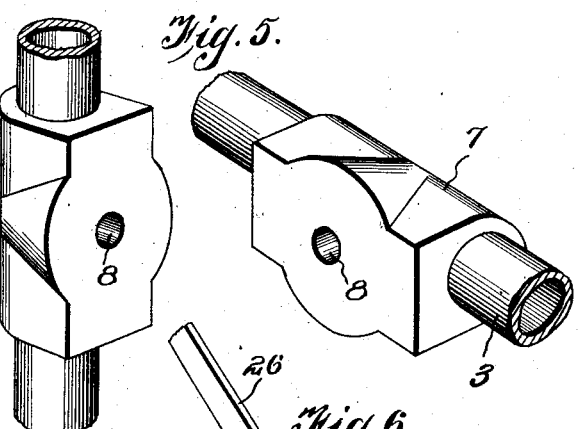
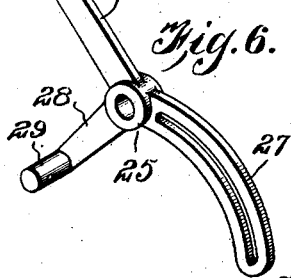
Witnesses
Louis R. Heinrichs
C. H. Griesbauer
Inventor
J. W. Osborne
by H. B. Willson & Co.
Attorneys

UNITED STATES PATENT OFFICE.

JOHN W. OSBORNE, OF WINCHESTER, ILLINOIS, ASSIGNOR OF ONE-HALF TO GEORGE HART, OF WINCHESTER, ILLINOIS.

CULTIVATOR.

No. 902,107.　　　　Specification of Letters Patent.　　　　Patented Oct. 27, 1908.

Application filed February 6, 1908. Serial No. 414,599.

*To all whom it may concern:*

Be it known that I, JOHN W. OSBORNE, a citizen of the United States, residing at Winchester, in the county of Scott and State of Illinois, have invented certain new and useful Improvements in Cultivators; and I do declare the following to be a full, clear, and exact description of the invention, such as will enable others skilled in the art to which it appertains to make and use the same.

This invention relates to new and useful improvements in cultivators.

One of the primary objects of the invention is the production of a comparatively simple and efficiently operating device of this character having means whereby the plows may be regulated to run at the desired depth in the ground.

A further object of the invention is to equip the machine with simple means under the control of the operator whereby the several gangs of plows may be raised clear of the ground in such cases where this would be desirable, as in turning at the end of the rows, or in going to and from the field to be plowed.

With these objects in view, the invention consists of certain novel features of construction, combination and arrangement of parts as will be described, and particularly pointed out in the appended claims.

In the accompanying drawings, Figure 1 is a view in side elevation of a cultivator constructed in accordance with the invention, parts being broken away to more advantageously illustrate certain features of the invention; Fig. 2 is a plan view of Fig. 1; Fig. 3 is a vertical section taken through the draft beam in front of the pressure springs for the plow beams, looking to the rear; Fig. 4 is a vertical section taken through one of the connections for the axle and machine frame. Fig. 5 is a detail perspective view of a portion of the machine frame and coöperative parts; and Fig. 6 is a detail perspective view of the lifting lever.

Referring to the drawings, which are for illustrative purposes only, and, therefore, are not drawn to scale, 1 indicates the main or supporting wheels of the cultivator, and 2 the machine axle, which is of bowed or approximately inverted U-shaped form. The machine frame 3 is of approximately U-shaped form, and is arranged with its cross member 4 disposed at the front of the machine, to which cross member is connected the inner or rear end of the draft tongue or beam, 5. The axle of the machine is formed from hollow tubing, having their ends connected at points suitable distances above the hubs of the supporting wheels by vertically disposed transversely apertured bearing members, 6, and the frame of the machine, 3, is also formed from hollow tubing or castings having their ends connected by corresponding longitudinally disposed bearing members, 7, adapted to bear or work against the inner faces of the members 6, and having central transverse apertures, 8, adapted for registration with the apertures of the former. Pivot members, 9, preferably in the form of bolts, are passed or extended through the apertures of the bearing members, 6 and 7, respectively, and have screwed on their outer or threaded ends fastening nuts, 10.

From the arrangement above described, it will be readily perceived that the U-shaped supporting axle of the machine may be swung either forwardly or rearwardly in a vertical plane and thereby permit of the frame 3 being raised or lowered, as desired.

In carrying out the invention, a transversely disposed tubular member 11 is fixedly mounted on the machine frame 3, a suitable distance in rear of the axle of the machine and has fixed on its central or intermediate portion an upright locking member, 12. A longitudinally disposed operating lever 13 is connected at its front or forward end to the center or intermediate portion of the cross member 14 of the supporting axle, and has formed in its upper edge near its rear or inner end a plurality of longitudinally spaced locking recesses, 15, adapted for locking engagement with the upper wall of an aperture or opening, 16, formed near the upper end of the locking member 12 for the passage or reception of the operating lever. A spring, 17, is fixed to the rear side edge of the member 12 and has its rear end disposed in a common plane with the operating lever, 13, and arranged to exert an upward pressure on the rear or recessed end of the same, the tendency of which is to maintain one of the locking recesses of the operating member in locking engagement with the upper wall of the aperture 16 of the locking member 12. From this arrangement it will be seen that by a proper manipulation of the operating member 13, the supporting axle 2 may be swung in a vertical plane, and the machine frame raised or lowered.

Fixed to the rear end of the draft beam, 5, of the machine by clips or other suitable fastening devices, is a transversely disposed supporting member, 18, which is preferably formed from a tubular casting, and depending from the ends of this member are two vertically disposed laterally spaced hangers, 19, also of preferably tubular form. Two vertically disposed supporting members, 20, are connected at their upper ends with the side members of the machine frame 3, and arranged between the lower ends of these members and the members, 19, are transversely disposed members, 21. A longitudinally disposed plow beam, 22, is pivotally connected in any suitable manner with each of the members 21, and each of these beams carries a gang of plows, 23, at its rear end. Each of said beams is also provided at its rear end with a cutting disk, 24, of any desired pattern, which is spaced laterally and arranged slightly in advance of its gang of plows, 23.

A lifting lever, 25, comprising an obliquely disposed handle, 26, a forwardly extending longitudinally slotted arm, 27, and an arm, 28, which is disposed at a suitable angle with the arm 27 and provided with a laterally extending pin or offset, 29, at its outer end, is pivotally mounted near each end of the member 10. The slotted arms 27 of these members are connected with the upper ends of vertically disposed connecting links or members 30, connected at their lower ends with the plow beams, 22, and the pins or offsets 29 of the arms 28 connect with the rear ends of longitudinally disposed springs, 31, fixed or fastened at their front ends to the machine frame in any suitable manner. These levers 25 are employed to raise the plow beams 22 above the ground in such cases where it is desirable, as in turning at the ends of the rows, or in going to or from the field, and, in raising the plow beams, the springs 31 coöperate with the operator because of the fact that they are arranged to normally exert a forward pull on the arm 28 of the lever 25. A spring, 32, having a straight, longitudinally disposed, rearwardly extending portion, 33, at its upper end is adjustably connected at such portion with a casting, 34, fixed near each end of the end portion of the machine frame, 3, which spring is bent intermediately of its ends and at a point in advance of its point of attachment to form a plurality of coils, 35, and is then extended rearwardly and connected at its extreme rear bent end, 36, with each of the plow beams, 22. The tendency of these springs, as will be readily perceived by examination of the drawings, is to maintain a downward pull on the plow beams and thereby keep the plows in the ground.

A chain 37 is connected at its rear end to each of the vertically disposed members 20 and at its forward end near one end of the doubletree, 38, sustained by the beam 5, said doubletree being equipped with the usual swingletrees, 39.

The numeral 40 represents a seat which is mounted on the machine frame at a suitable point in rear of the supporting wheels and in position to permit of the arms 26 of the lifting levers to be easily grasped by the operator.

By constructing the frame of the machine of tubular castings, or members, it will be seen that while the machine is of exceedingly light weight, and, therefore, more easily drawn by the draft animals, it possesses considerable strength and is adapted for rough usage without its parts becoming deranged or inoperative.

Having thus fully described my invention, what I claim as new and desire to secure by Letters-Patent, is:

1. In a machine of the character described, the combination with the supporting wheels, of a bowed axle, a U-shaped frame pivotally connected to the vertical portions of said axle, an upright locking member having an aperture near its upper end, fixedly mounted on the frame in rear of the axle, a longitudinally disposed operating member connected with the central portion of the axle and having a plurality of spaced locking recesses formed in its upper edge for engaging the upper wall of the locking member aperture, and a resilient element fixed to the locking member for maintaining one of the locking recesses of the operating member in locking engagement with the aperture of the locking member.

2. In a machine of the character specified, the combination with the supporting wheels, of a bowed axle, a U-shaped frame pivotally connected with the end pieces of the axle, means for locking the axle in an adjusted position, plow beams pivotally sustained by the frame, plows at the free ends of said beams, lifting mechanism sustained by the frame, and operable for raising the plow beams, and resilient means for normally exerting pressure upon the plow beams.

3. In a machine of the character specified, the combination with the supporting wheels, of an axle, a frame pivotally connected to the axle longitudinally disposed plow beams pivotally mounted below the frame, plows at the ends of said beams, lifting levers pivotally mounted on the frame in rear of the axle, means for connecting the forward ends of said levers with the free ends of the plow beam, and longitudinally disposed pull springs fixed to the frame and connected with the lifting levers.

In testimony whereof I have hereunto set my hand in presence of two subscribing witnesses.

JOHN W. OSBORNE.

Witnesses:
 JAS. B. DAVIS, Jr.,
 CHARLES CRISP.